United States Patent
Radakovitz et al.

(10) Patent No.: US 9,367,198 B2
(45) Date of Patent: Jun. 14, 2016

(54) SPIN CONTROL USER INTERFACE FOR SELECTING OPTIONS

(75) Inventors: Samuel Chow Radakovitz, Puyallup, WA (US); Brian Scott Ruble, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/771,422

(22) Filed: Apr. 30, 2010

(65) Prior Publication Data

US 2011/0271233 A1    Nov. 3, 2011

Related U.S. Application Data

(63) Continuation-in-part of application No. 12/770,992, filed on Apr. 30, 2010.

(51) Int. Cl.
    *G06F 3/048*    (2013.01)
    *G06F 17/24*    (2006.01)
    *G06F 3/0481*   (2013.01)

(52) U.S. Cl.
    CPC ............ *G06F 3/0481* (2013.01); *G06F 17/246* (2013.01)

(58) Field of Classification Search
    CPC .... G06F 17/246; G06F 3/0482; G06F 3/0481
    USPC .................................................. 715/218, 834
    See application file for complete search history.

(56) References Cited

U.S. PATENT DOCUMENTS

| 5,706,448 | A | * | 1/1998 | Blades | 715/834 |
| 5,745,717 | A | * | 4/1998 | Vayda et al. | 715/834 |
| 5,940,076 | A | * | 8/1999 | Sommers et al. | 715/834 |

(Continued)

FOREIGN PATENT DOCUMENTS

| CN | 1335951 A | 2/2002 |
| CN | 1794220 A | 6/2006 |

(Continued)

OTHER PUBLICATIONS

Microsoft; "*Microsoft Office Online—Microsoft Office Excel—Change the format of chart elements*"; accessed on Feb. 25, 2010, at http://office.microsoft.com/en-us/excel/HA101534471033.aspx; 5 pgs.

(Continued)

*Primary Examiner* — Andrea Long
(74) *Attorney, Agent, or Firm* — Damon Rieth; Tom Wong; Micky Minhas

(57) ABSTRACT

A spin control graphical user interface is used to display a currently applied option and to receive options from a user. The spin control is a circular graphical user interface that is positioned near a displayed document to which it applies. For example, the spin control may be positioned on or near a corner of the displayed document. The spin control comprises options that are presented to a user upon rotation of the spin control. An option may be manually selected or automatically selected and applied to the displayed document upon rotating the spin control clockwise or counterclockwise. More than one spin control may be associated with the displayed document. The spin control may be automatically shown and removed from a display in response to whether the document to which the spin control is attached is currently being displayed.

20 Claims, 13 Drawing Sheets

(56) References Cited

U.S. PATENT DOCUMENTS

| | | | |
|---|---|---|---|
| 6,028,600 A * | 2/2000 | Rosin et al. | 715/718 |
| 6,223,189 B1 | 4/2001 | Steffens | |
| 6,448,987 B1 * | 9/2002 | Easty et al. | 715/834 |
| 6,480,194 B1 | 11/2002 | Sang'udi et al. | |
| 6,515,682 B1 | 2/2003 | Washington et al. | |
| 6,920,608 B1 | 7/2005 | Davis | |
| 7,036,090 B1 * | 4/2006 | Nguyen | 715/834 |
| 7,210,107 B2 * | 4/2007 | Wecker et al. | 715/863 |
| 7,516,419 B2 * | 4/2009 | Petro et al. | 715/834 |
| 8,352,881 B2 * | 1/2013 | Champion et al. | 715/834 |
| 8,402,391 B1 * | 3/2013 | Doray et al. | 715/834 |
| 2002/0122072 A1 * | 9/2002 | Selker | 345/834 |
| 2003/0154443 A1 | 8/2003 | Papierniak | 715/211 |
| 2003/0169295 A1 | 9/2003 | Becerra | |
| 2004/0212617 A1 * | 10/2004 | Fitzmaurice et al. | 345/440 |
| 2007/0063995 A1 * | 3/2007 | Bailey et al. | 345/184 |
| 2007/0083547 A1 | 4/2007 | Schnauffer | |
| 2007/0260970 A1 * | 11/2007 | Dorwart | 715/502 |
| 2008/0082908 A1 | 4/2008 | MacGregor | |
| 2008/0115049 A1 | 5/2008 | Tolle | 715/209 |
| 2008/0222569 A1 * | 9/2008 | Champion et al. | 715/834 |
| 2008/0229245 A1 * | 9/2008 | Ulerich et al. | 715/834 |
| 2009/0007015 A1 * | 1/2009 | Mandic et al. | 715/834 |
| 2009/0079731 A1 * | 3/2009 | Fitzmaurice et al. | 345/419 |
| 2009/0313537 A1 | 12/2009 | Fu et al. | |
| 2009/0327963 A1 * | 12/2009 | Mouilleseaux et al. | 715/834 |
| 2010/0185985 A1 * | 7/2010 | Chmielewski et al. | 715/834 |
| 2011/0095993 A1 * | 4/2011 | Zuverink | 345/173 |

FOREIGN PATENT DOCUMENTS

| | | |
|---|---|---|
| CN | 101253494 A | 8/2008 |
| CN | 101300571 A | 11/2008 |
| CN | 101689179 A | 3/2010 |
| JP | H0-33089 A | 1/1991 |
| JP | H03-225572 A | 10/1991 |
| JP | 08227348 | 9/1996 |
| JP | H09-153101 A | 6/1997 |
| JP | 2001-188805 A | 7/2001 |
| JP | 2001-357344 A | 12/2001 |
| JP | 2003-016226 A | 1/2003 |
| JP | 3515485 | 1/2004 |
| JP | 2005-258548 A | 9/2005 |
| JP | 2005-269243 A | 9/2005 |
| JP | 2007-140625 A | 6/2007 |
| JP | 2008-535125 A | 8/2008 |
| TW | 2006036551 A | 10/2006 |
| TW | 200704121 A | 1/2007 |
| TW | 200905490 A | 2/2009 |
| TW | 200928950 A | 7/2009 |
| WO | 2006/108159 A2 | 10/2006 |

OTHER PUBLICATIONS

"Chart View"; accessed on Feb. 25, 2010 at http://help.creator.zoho.com/chart-view.html; 4 pgs.

SAS Institute, Inc.; "Defining a Data Source"; accessed Feb. 25, 2010, at http://support.sas.com/doumentation/cdl/en/bidbrdug/61856.html; 11 pgs.

The MathWorks; Displaying Query Results :: Using Visual Query Builder (Databse Toolbox™); accessed Feb. 25, 2010, at http://www.mathworks.com/access/helpdesk/help/toolbox/database/ug/f7-27823.html; 10 pgs.

Davis, Y.; "Google Docs: Creating Charts in Spreadsheets"; Bright Hub!; Jun. 18, 2009; http://www.brighthub.com/internet/google/articles/5747.aspx; 2 pgs.

Cahill, C.; "Silverlight Chart Data-Point Markers and Mouse Events"; Nov. 19, 2009; http://www.componentart.com/community/blogs/corey/archive/2009/11/19/silverlight-chart-data-point-markers-on-mouse-hover.aspx; 5 pgs.

Mitchell, S.; "Using Microsoft's Chart Controls in an ASP.NET Application: Serializing Chart Data"; http://www.4guysfromrolla.com/articles/021010-1.aspx; 7 pgs.

U.S. Appl. No. 12/770,992, entitled "Temporary Formatting and Charting of Selected Data" filed Apr. 30, 2010.

International Search Report mailed Feb. 17, 2012, issued in PCT/US2011/033804.

Mrexcel.com forums; "Change chart colors based on value?", May 21, 2007; http://www.mrexcel.com/forum/excel-questions/262749-change-chart-colors-based-value.html.

Pcreview.com; "Sorting in an Excel Chart won't work properly"; Jan. 8, 2007; http://www.pcreview.co.uk/forums/sorting-excel-chart-wont-work-properly-t2810060.html.

Wilson, J.; "Excel 2003: Charting, Learning Guide"; Tufts University ITS, May 4, 2006; http://ase.tufts.edu/its/tranDocuments/excel03Charting.pdf.

Office Action mailed Dec. 18, 2012, issued in U.S. Appl. No. 12/770,992.

Marmel, E., "Absolute Beginner's Guide to Quattro Pro® X3, Feb. 8, 2006, Que, Chapter 11, Creating a Chart".

Office Action mailed Apr. 25, 2013, in Chinese Patent Appl. No. 201180021494.6, w/translation.

Office Action mailed Jul. 9, 2013, in New Zealand Patent Appl. No. 603049.

Officelabs, Chart Advisor, [video] retrieved from http://www.youtube.com/watch?v=kNGOQMxBu3I on Sep. 9, 2013, screenshots and transcript created Sep. 9, 2013, video published Aug. 28, 2008.

Office Action mailed Oct. 17, 2013, in Chinese Patent Appl. No. 201180021494.6, w/translation.

Office Action mailed Sep. 30, 2013, in New Zealand Patent Appl. No. 603049.

Office Action mailed Aug. 29, 2013, in Columbia Patent Appl. No. 12-215867, w/summary.

Office Action mailed Sep. 16, 2013, issued in U.S. Appl. No. 12/770,992.

Amendment filed Jun. 18, 2013, in U.S. Appl. No. 12/770,992.

"Final Rejection Received in Chinese Patent Application No. 201180021494.6", Mailed Date: Mar. 6, 2014. Filed Date: Apr. 25, 2011, 6 pages.

"First Office Action Received in Australian Patent Application No. 2011245430", Mailed Date: Feb. 14, 2014, Filed Date: Apr. 25, 2011, 2 pages.

"Office Action Issued in Australia Patent Application No. 2011245657", Mailed Date: Feb. 26, 2014, 3 Pages.

"Office Action Issued in Australia Patent Application No. 2011245657", Mailed Date: Apr. 16, 2014, 3 Pages.

"Office Action Issued in Australia Patent Application No. 2011245657", Mailed Date: Aug. 26, 2014, 5 Pages.

"Office Action Issued in Colombia Patent Application No. 12-215867", Mailed Date: Apr. 28, 2014, 6 Pages.

Oppenheimer, Diego, "Chart Advisor", Published on: Sep. 25, 2008, Avaialble at: http://blogs.office.com/2008/09/25/chart-advisor/.

Amendment filed Feb. 12, 2014, in U.S. Appl. No. 12/770,992.

"Office Action issued in Japanese Patent Application No. 2013-507996", Mailed Date: Feb. 24, 2015, 12 Pages.

"Office Action issued in Japan Patent Application No. 2013-508129", Mailed Date: Mar. 3, 2015, 4 Pages.

"Third Office Action and Search Report Issued in Chinese Patent Application No. 201180021494.6", Mailed Date: Mar. 17, 2015, 12 Pages.

"Office Action issued in Chile Patent Application No. 201203002", Mailed Date: Mar. 20, 2015, 5 Pages (w/o English Translation).

"Office Action Received for Russian Patent Application No. 2012146096", Mailed Date: Apr. 2, 2015, 6 Pages (w/o English Translation).

"First Office Action and Search Report Issued in Chinese Patent Application No. 201180021493.1", Mailed Date: Oct. 27, 2014, 14 Pages.

"Office Action Issued in Israel Patent Application No. 222259", Mailed Date: Aug. 30, 2015, 2 Pages.

"Office Action Issued in Taiwan Patent Application No. 100110806", Mailed Date: Sep. 1, 2015, 10 Pages.

Amendment filed Oct. 5, 2015, in U.S. Appl. No. 12/770,992.

(56) References Cited

OTHER PUBLICATIONS

"Office Action Received for Chile Patent Application No. 201203002", Mailed Date: Sep. 8, 2015, 5 Pages. (W/O English Translation).
"Office Action Received for Taiwan Patent Application No. 100109576", Mailed Date: Jun. 3, 2015, 11 Pages.
"Second Office Action Received for China Patent Application No. 201180021493 1", Mailed Date: Jun. 11, 2015, 11 Pages.
Japanese Notice of Allowance for Application No. 2013-508129- mailed Jul. 7, 2015.
Chinese Fourth Office Action for Application No. 201180021494.6 mailed Aug. 4, 2015.
Office Action mailed Jun. 4, 2015, issued in U.S. Appl. No. 12/770,992.
Office Action mailed Feb. 5, 2016, issued in US. Appl. No. 12/770,992.
"Third Office Action Issued in Chinese Patent Application No. 201180021493.1", Mailed Date: Dec. 21, 2015, 12 pages.
"Office Action Issued in Russian Patent Application No. 2012146096 ", Mailed Date: Dec. 16, 2015, 5 pages (W/O English Translation).
"Fifth Office Action Issued in Chinese Patent Application No. 201180021494.6", Mailed Date: Dec. 25, 2015, 7 pages.
"Office Action Issued in Japanese Patent Application No. 2013- 507996", Mailed Date: Jan. 20, 2016, 6 pages.
Abe, Kaori, "Hitome De Wakaru Excel 2013", 1st Edition, Nikkei Business Publications, Inc., Feb. 12, 2013.

* cited by examiner

| Department | January | February | March | April | May | June | July | August | September | October | November | December |
|---|---|---|---|---|---|---|---|---|---|---|---|---|
| Women | $7,395 | $8,744 | $6,295 | $8,584 | $7,071 | $5,647 | $8,369 | $7,417 | $6,868 | $4,924 | $5,174 | $6,693 |
| Men | $6,700 | $6,342 | $5,134 | $7,938 | $7,027 | $4,878 | $4,846 | $8,358 | $5,729 | $5,481 | $9,179 | $9,882 |
| Baby | $9,368 | $6,904 | $9,387 | $5,491 | $6,966 | $7,867 | $7,870 | $9,932 | $8,154 | $8,697 | $5,281 | $5,523 |
| Kids | $8,554 | $8,541 | $7,450 | $6,894 | $4,575 | $8,094 | $8,526 | $5,413 | $7,558 | $4,359 | $6,528 | $9,200 |
| Shoes | $9,772 | $6,426 | $5,607 | $8,948 | $4,037 | $8,096 | $7,871 | $6,402 | $6,111 | $9,424 | $8,559 | $8,824 |
| Home | $8,051 | $8,229 | $4,612 | $7,724 | $9,114 | $6,617 | $4,995 | $8,248 | $7,008 | $6,040 | $7,209 | $9,644 |
| Bed & Bath | $8,527 | $9,328 | $8,547 | $7,503 | $5,435 | $6,696 | $4,439 | $6,722 | $7,852 | $4,605 | $6,788 | $5,281 |
| Patio & Garden | $5,290 | $9,565 | $8,484 | $7,383 | $9,909 | $7,281 | $7,393 | $6,245 | $7,545 | $7,325 | $6,031 | $7,339 |
| Furniture | $8,975 | $7,447 | $8,015 | $8,754 | $4,934 | $9,359 | $4,559 | $9,039 | $4,823 | $4,283 | $8,622 | $8,984 |
| Toys | $6,395 | $8,334 | $9,927 | $6,649 | $9,798 | $7,602 | $9,546 | $5,886 | $8,806 | $4,641 | $4,365 | $8,269 |
| Electronics | $9,368 | $5,923 | $7,837 | $4,385 | $5,528 | $9,983 | $5,967 | $6,983 | $9,039 | $6,270 | $9,083 | $8,354 |

*Fig. 3A*

SPIN CONTROL USER INTERFACE FOR SELECTING OPTIONS

RELATED APPLICATIONS

The present application is a continuation-in-part of U.S. patent application Ser. No. 12/770,992, filed Apr. 30, 2010, which is incorporated by reference and claims the benefit of the earlier filing date under 35 U.S.C. §120.

BACKGROUND

Many individuals spend a lot of time trying to visualize data. Data is often presented in rows and columns of a spreadsheet as blocks of information without any visual graphical representation of the data. In order to understand the data, users spend time trying to figure out the best way to view the data and then create the charts that is needed to understand it. This process takes time and expertise in knowing how to use the visualization features of an application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A spin control graphical user interface is used to display a currently applied option and to receive selections from a user. The spin control is a circular graphical user interface element that is positioned near a displayed document to which it applies. For example, the spin control may be positioned on or near a corner of the displayed document. The spin control includes options that are presented to a user upon rotation of the spin control. An option may be manually selected or automatically selected and applied to the displayed document upon rotating the spin control clockwise or counterclockwise. More than one spin control may be associated with the displayed document. The spin control may be automatically shown and removed from a display in response to whether the document to which the spin control is attached is currently being displayed.

DETAILED DESCRIPTION

Figure 1:
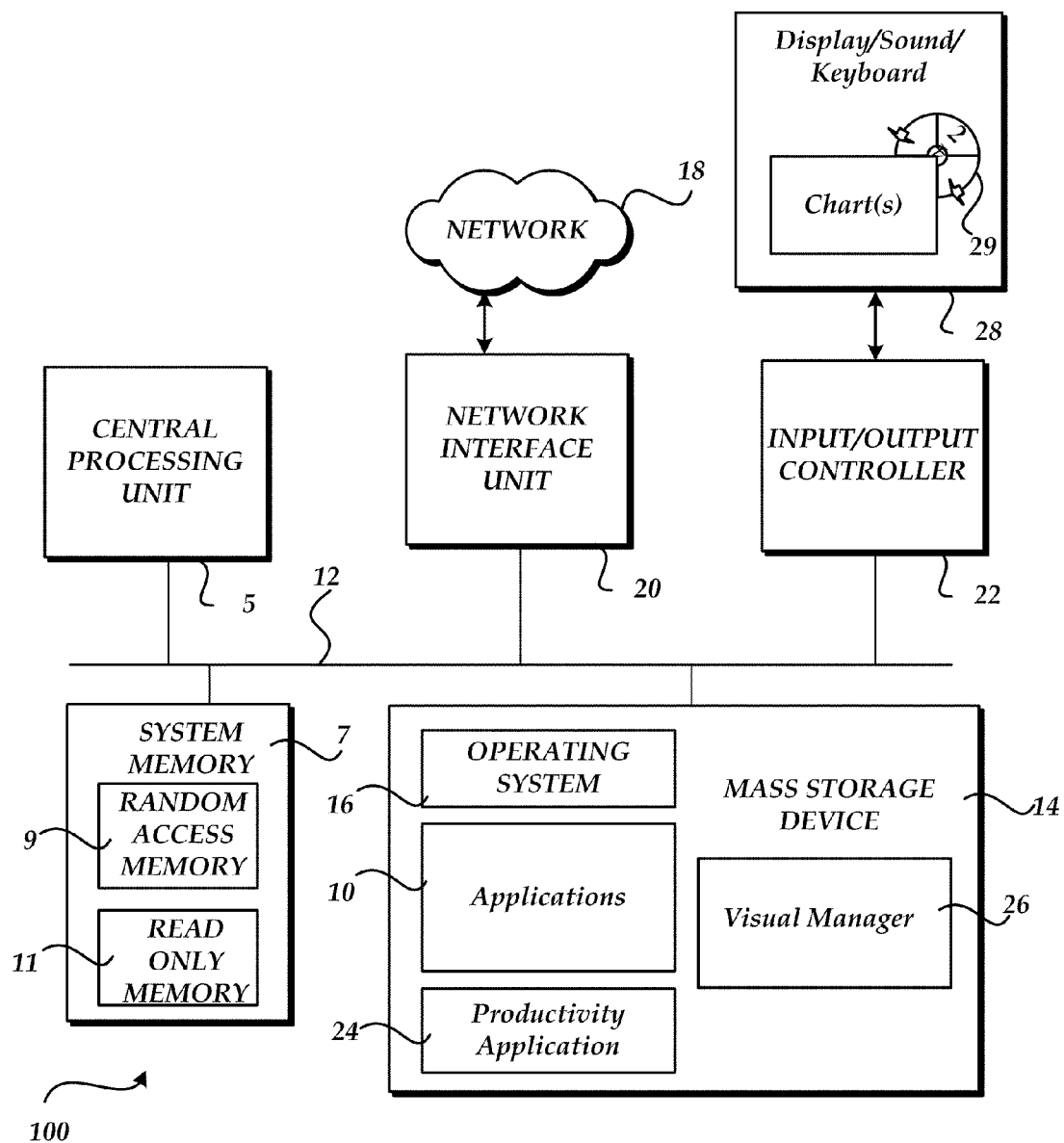
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage mediums and communication media. Computer storage mediums includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. Spin control User interface (UI) 29 is designed to provide a user with a visual way to interact with a displayed document such as graphical charts. Other UI elements may also be used to interact with functionality that is included on computing device 100.

As mentioned briefly above, a number of program modules and data files may be stored in the mass storage device 14 and RAM 9 of the computer 100, including an operating system 16 suitable for controlling the operation of a networked computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs. One of the application programs is a productivity application 24, such as one of the MICROSOFT EXCEL® or one of the other MICROSOFT OFFICE® programs. Generally, productivity application 24 is an application that a user utilizes when viewing and interacting with a block of data, such as within a spreadsheet and/or a table. Productivity application 24 is an application such as a spreadsheet program, a database program, a word-processing program, a presentation program and the like.

Visual manager 26 is configured to automatically temporarily format and chart selected data to assist a user in viewing and understanding the selected data. Since the charting is automatically performed on the charted data, the user does not have to manually create the display of the charted data. Once the temporary formatting and charting is automatically applied to the selected data, the user may interact with the visual formatting and charts to gain additional information. For example, the chart may be formatted differently, reference lines may be added, the chart may be sorted, the type of chart(s) displayed may be changed, the user may navigate over the chart to obtain more detailed information, and the like. Once the user has completed interacting with the temporarily formatted and created chart(s) they are removed from the display 28.

A spin control graphical user interface 29 is also associated with a displayed document, such as the displayed charts, that is used to display a currently applied option and to receive options from a user. The spin control 29 is a circular graphical user interface that is positioned near a displayed document to which it applies. For example, the spin control may be positioned on or near a corner of the displayed document. The spin control includes options that are presented to a user upon rotation of the spin control. An option may be manually selected or automatically selected and applied to the displayed document upon rotating the spin control clockwise or counterclockwise. More than one spin control may be associated with the displayed document. Once the user has completed interacting with the temporarily formatted and created chart(s) the chart(s) and the spin control(s) are removed from the display 28.

Figure 2:
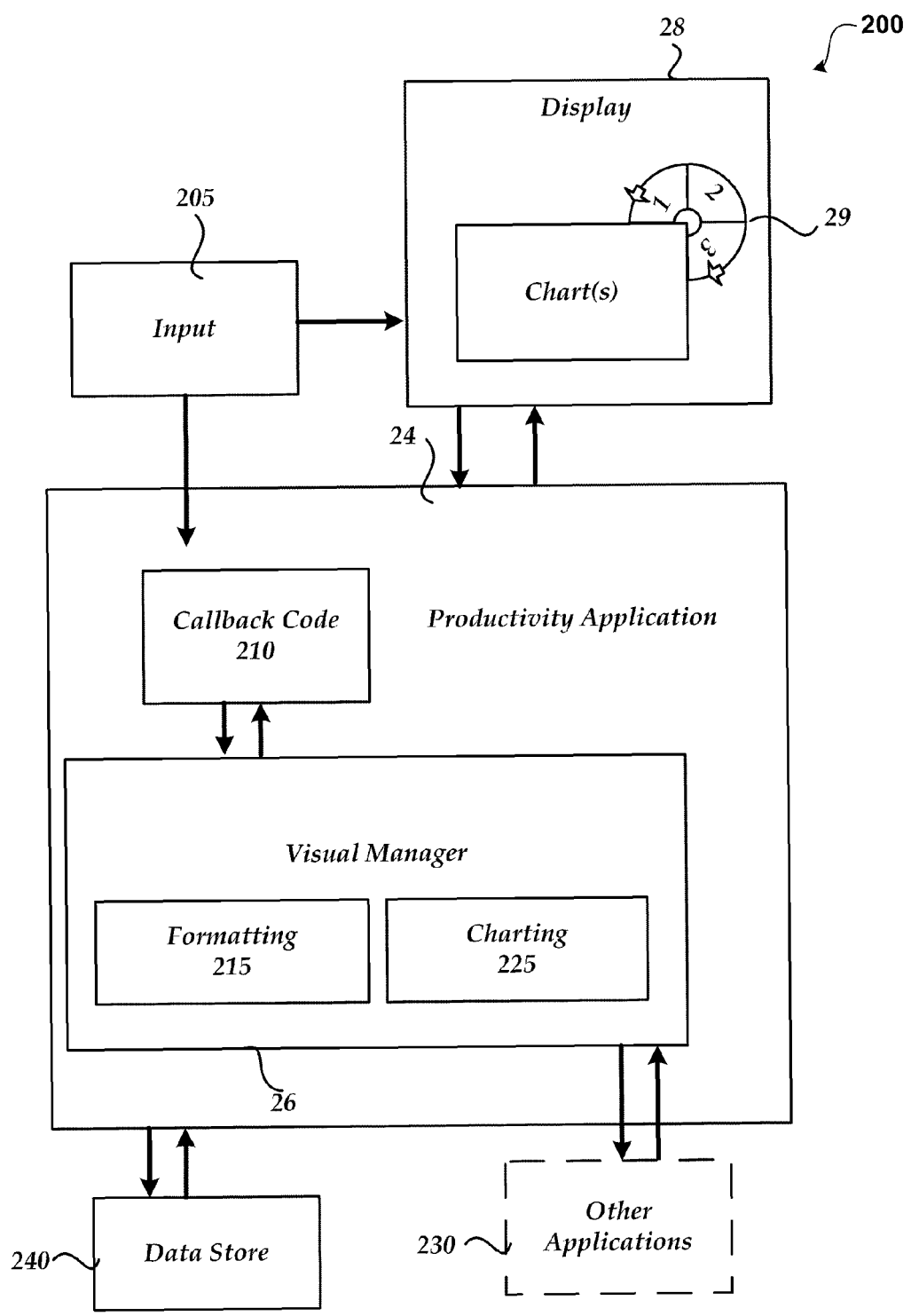
FIG. 2 shows an example temporary formatting and charting system.

FIG. 2 shows an example temporary formatting and charting system. As illustrated, system 200 includes display 28, spin control 29, visual manager 26, input 205, productivity application 24, data store 240, and other applications 230. Visual manager 26 may be implemented within presentation application 24 as shown in FIG. 2 or may be implemented externally from application 24 as shown in FIG. 1.

In order to facilitate communication with the visual manager 26, one or more callback routines, illustrated in FIG. 2 as callback code 210, may be implemented. Through the use of the callback code 210, the visual manager 26 may query for additional information used in temporarily formatting and charting data selected from within productivity application 24. For example, visual manager 26 may request to be informed when a user selects data, selects a user interface element, such as spin control 29, that is associated with one of the temporarily displayed charts and/or move and navigates over a displayed chart. Other information may also be provided that relate to the features of the application. As discussed above, visual manager 26 is configured to automatically format and create charts from data that is selected within productivity application 24 such that the selected data may be understood in a graphical manner.

Figure 3B:
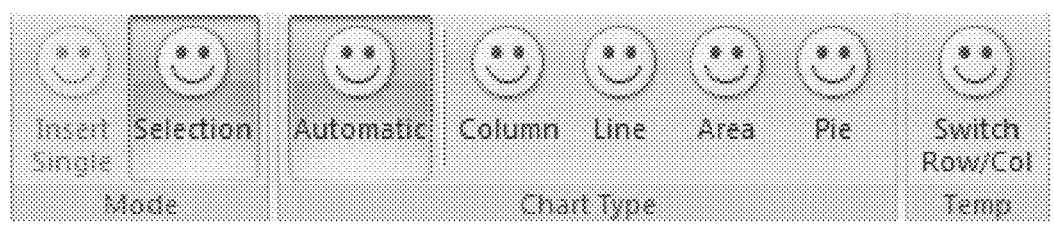
FIGS. 3-5 show exemplary user interfaces and displays for temporarily formatting and charting selected data.
Figure 4A:
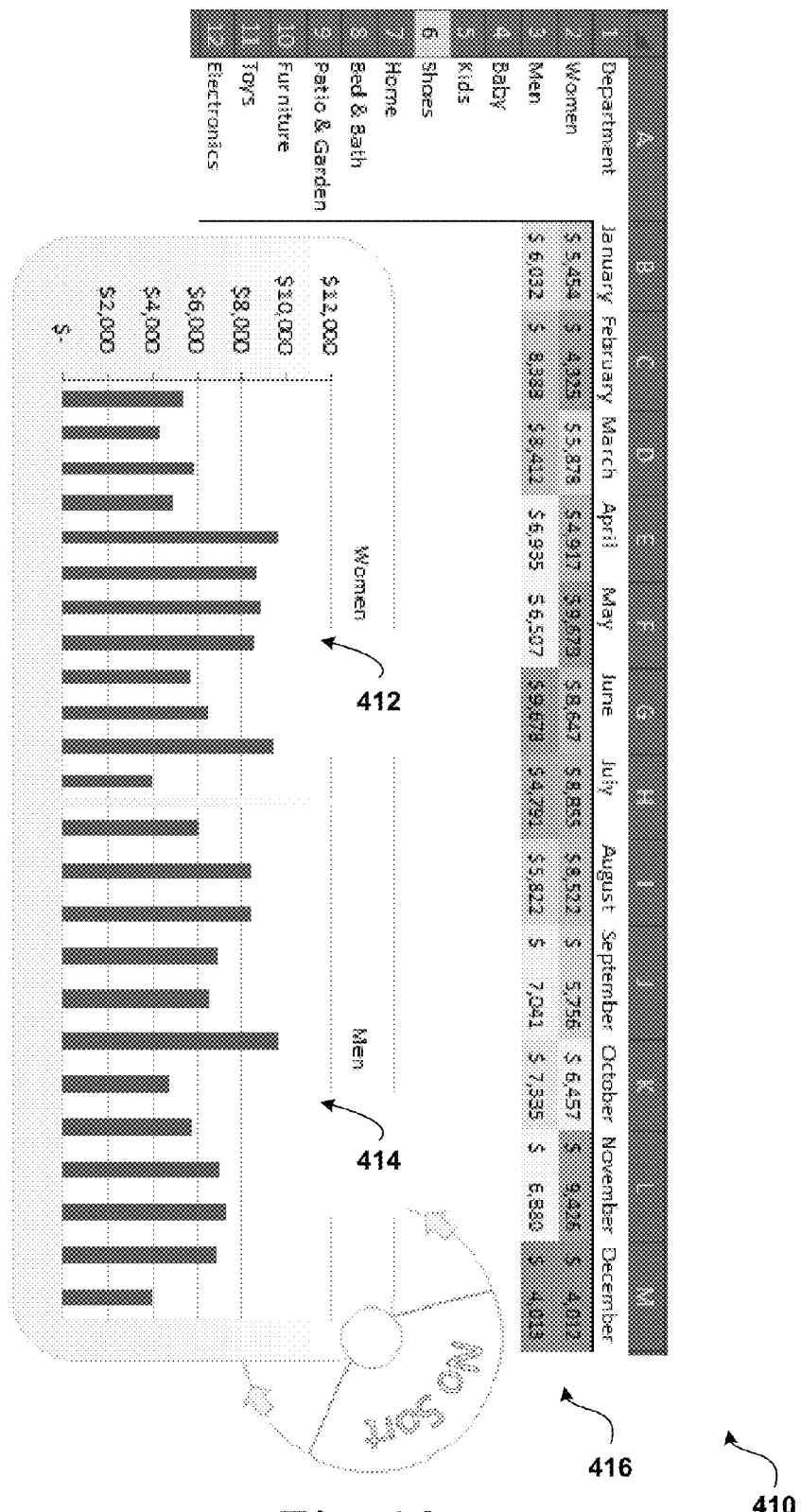
Figure 4B:
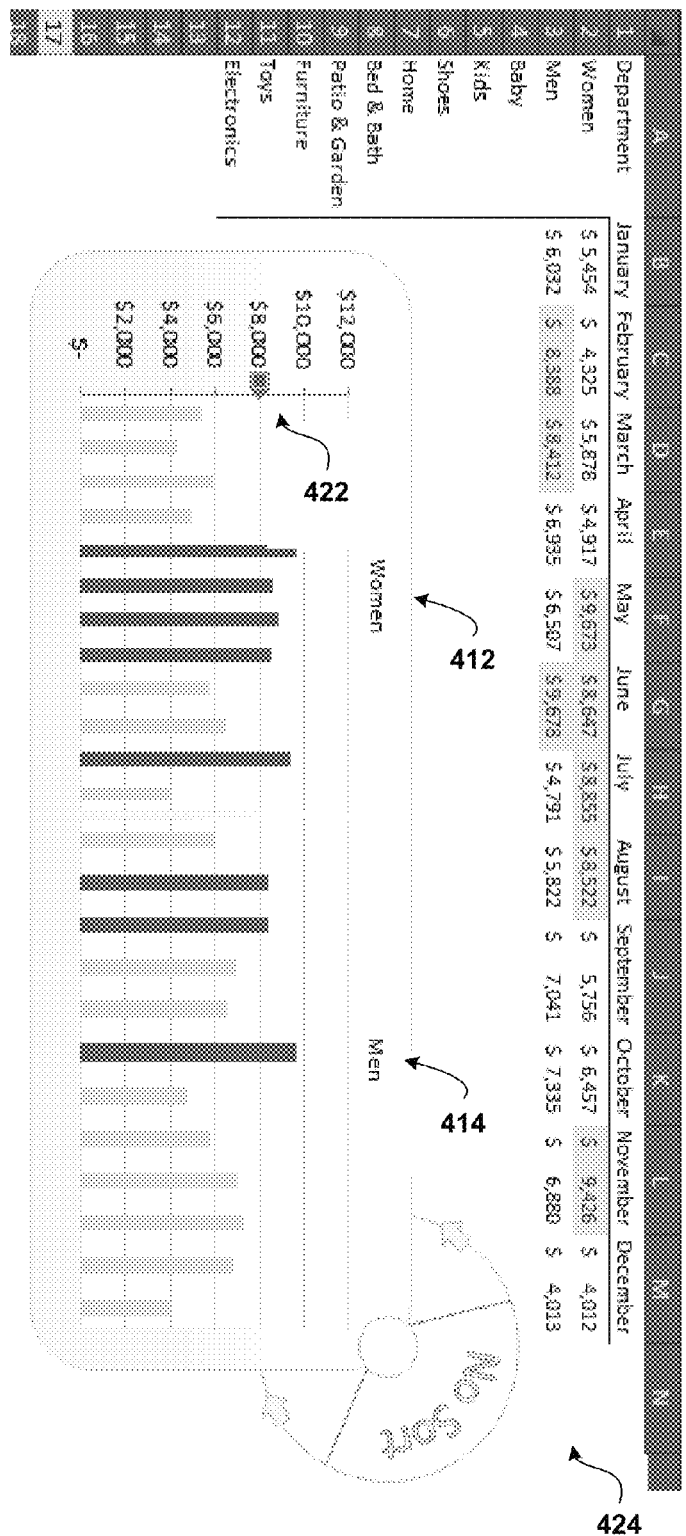
Figure 4C:
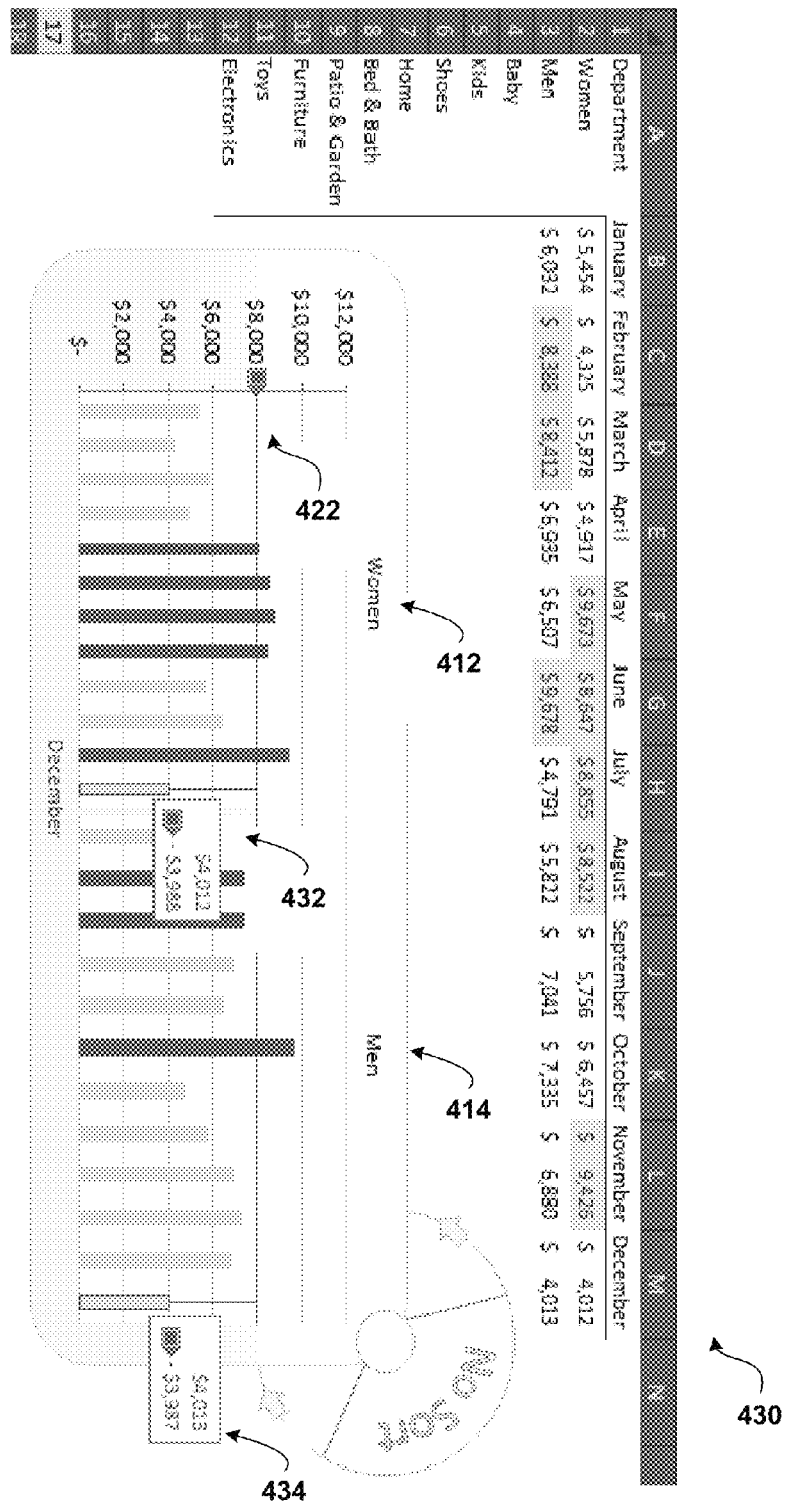
Figure 5:
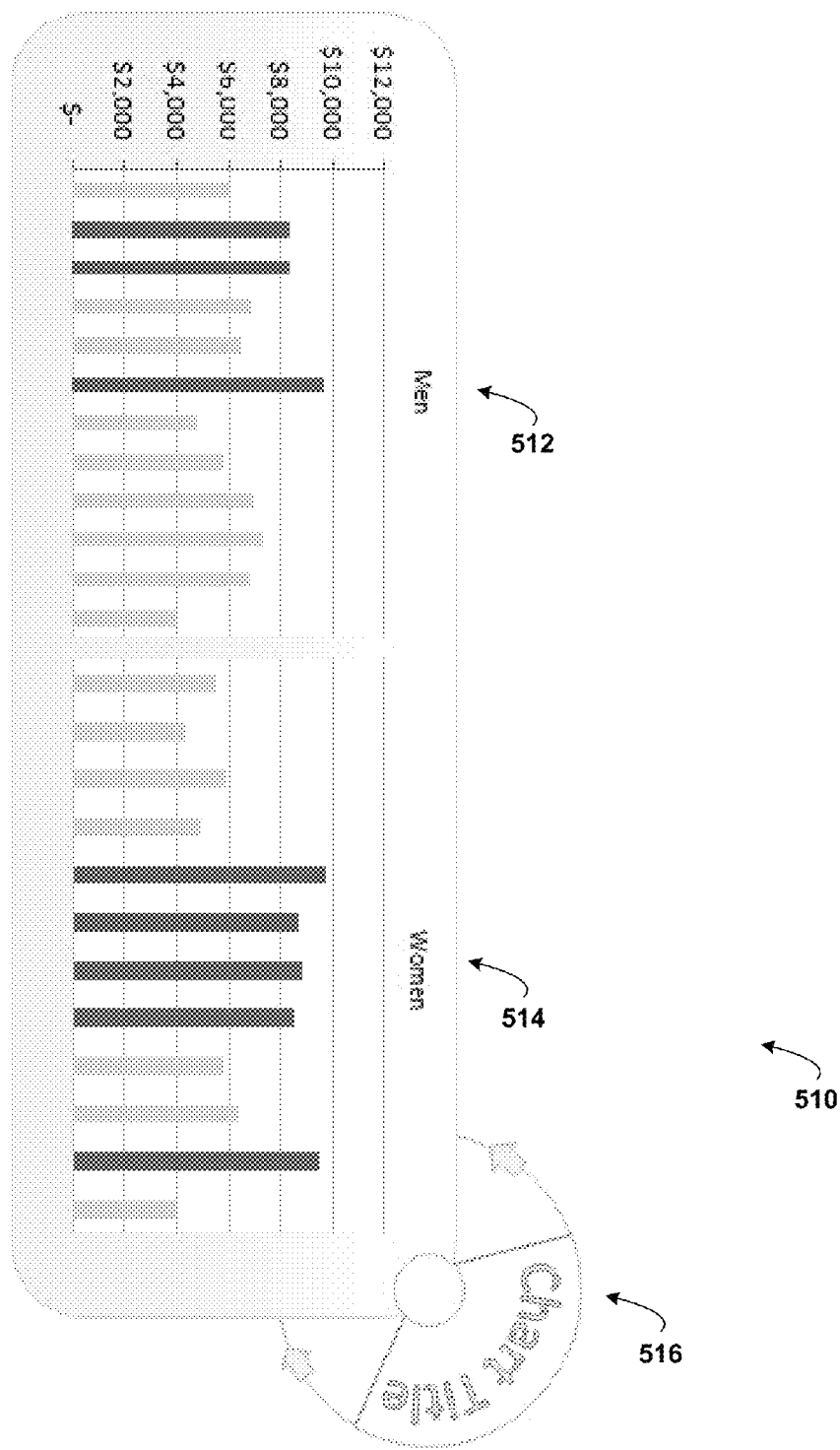

Display 28 is configured to provide the user with a visual display of the temporarily formatted and displayed chart(s) based on the selected data (See FIGS. 3-5 for exemplary displays). Input 205 is configured to receive input from one or more input sources, such as a keyboard, mouse, a touch screen, and/or some other input device. For example, the input may be a mouse movement over a displayed chart, a selection of data, a selection of a menu item, hovering over an item, and the like. The input may be directed at interacting with spin control 29. As shown, spin control illustrates that a second option ("2") is currently applied to the displayed chart(s). According to one embodiment, rotation of spin control 29 results in another option being automatically applied to the displayed chart(s). For example, rotating the spin control clockwise results in a first option being applied to the displayed chart(s) whereas rotating the spin control counterclockwise results in a third option being applied to the displayed chart(s).

Data store 240 is configured to store data relating to productivity application 24. For example, data store 240 may be used to store the data that is displayed within the rows and columns of a spreadsheet.

Visual manager 26 may also coupled to other applications 230 such that data to be temporarily formatted and charted may be received from the other applications. For example, visual manager 26 may be coupled to another productivity application and/or a networking site that provides data that is used in temporarily formatting and creating charts.

FIGS. 3-5 show exemplary user interfaces and displays for temporarily formatting and charting selected data. Referring now to FIG. 3A, display 310 shows a spreadsheet containing rows and columns of data. The data may be provided by a variety of sources. For example, the data may be obtained from a database, a file, another application, a live data source, and the like. When a user would like to temporarily format and view data from the data source they enter a temporary charting mode and select the data they would like to be temporarily formatted and charted. In the current example, the user has selected the women's row and the men's row of data (315). The user may select as much data as they wish to view in a chart. For example, the user may select a single row, two rows, three rows, and the like. The user may also select as few or as many columns as they desire to view. For example, the user may select only a portion of the columns presented within the data.

The user may enter the temporary chart view in a variety of manners. In the current example, the user selects the selection option and the automatic option shown in user interface 320 of FIG. 3B. Other user interfaces may be used to enter the mode. For example, the user could right click to bring up a context menu, select a menu option from a toolbar or menu, and the like. According to another embodiment, the chart may be automatically displayed upon the selection of data without first selecting a temporary charting option.

Figure 3C:
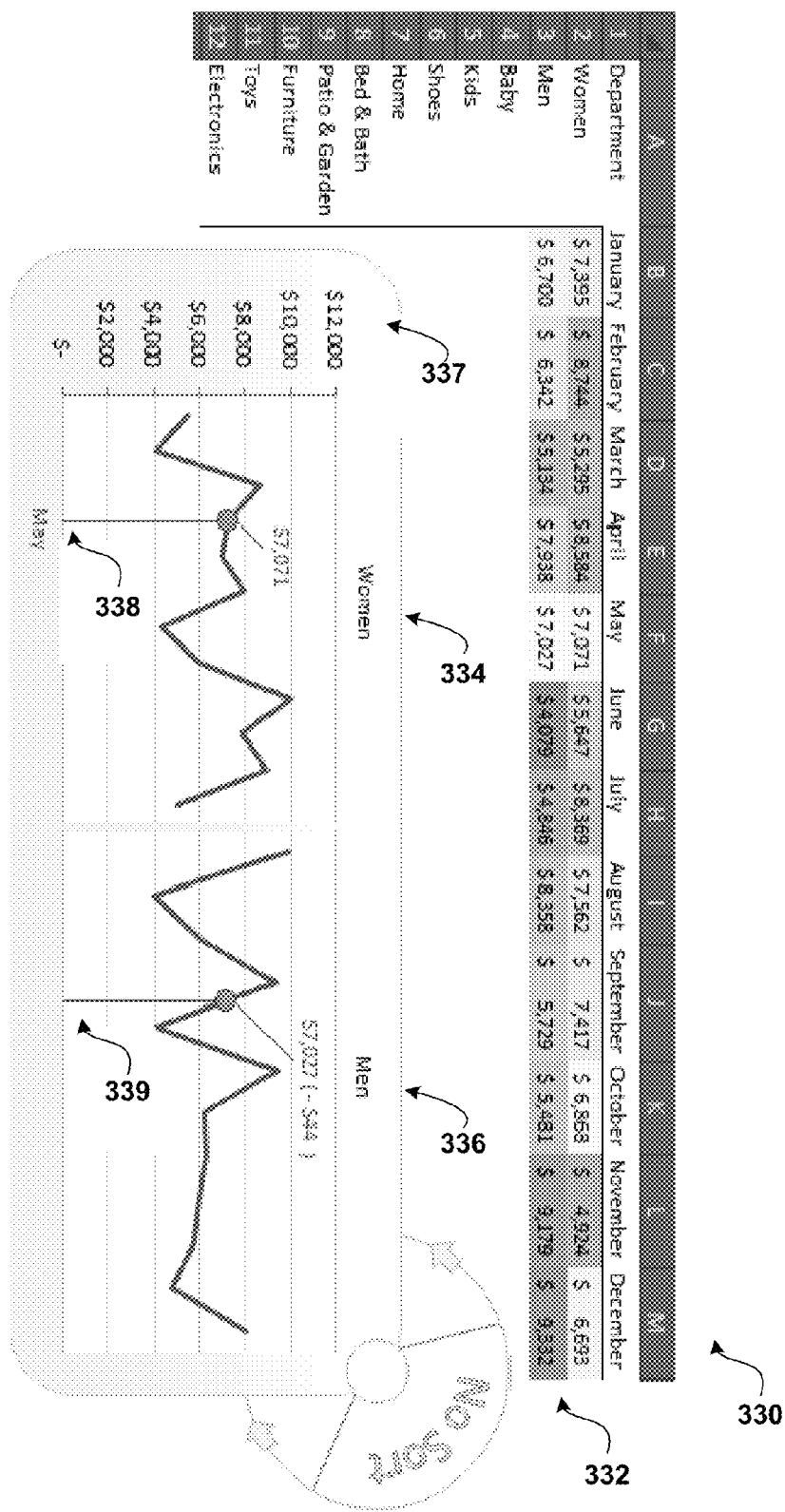

After entering the temporary formatting and charting mode, a selection of data, such as selection 315, displays the selected data in a chart form. As illustrated, display 330 of FIG. 3C shows chart 334 that displays a chart for the values in the selected women's row and chart 336 that displays a chart for the values in the selected men's row. According to one embodiment, a separate chart is created for each row of data that is selected. According to another embodiment, a single chart is created using the data. In the current example, the chart type was set to be automatically selected based on the selected data. Many different types of charts may be displayed, such as, but not limited too: column; line; area; and pie charts. According to one embodiment, charts 334 and 336 share a common axis (337) such that the charts may be easily compared. According to another embodiment, each chart is individually created such that each axis depends on the data within its selected row. As discussed above, when a user moves and navigates over the chart more information may be displayed to the user. In the current example, the user has moved over point 338 on line chart 334. In response to navigating to a point, a graphical representation of the corresponding value in the selected data is displayed. In the current example, point 338 corresponds to the May value in the Women's row which is $7,071. In the current example, a corresponding graphical display is provided in the other displayed charts at the corresponding location to point 338. For example, in chart 336, point 338 in chart 334 corresponds to point 339 in chart 336. The value for point 339 is $7,027 which is the May value from the Men's row. In addition to displaying the corresponding value from the other selected rows, a difference may also be graphically shown such that a direct comparison between the values of the charts may be readily determined. In the present example, the difference is $44 (7,071–7,027). More formatting of the data may be provided to assist the user in visualizing the data. For example, different colors may be used within the display, different values may be highlighted within the data, some data may be hidden from view, and the like. In display 330 it can be seen that the rows of data that are not selected are hidden from view while the charts are temporarily displayed. According to another embodiment, the charts that are temporarily displayed may be presented in one or more different windows from the display of the data.

FIGS. 4A-4C show exemplary displays that illustrate different charting and formatting options.

Display 410 of FIG. 4A shows a display of a bar chart 412 for a women's row and a bar chart 414 for a men's row of data (416). The type of chart may be pre-configured, automatically selected based on the selected data (416) and/or changed from a default chart type. For example, a user may use a user interface such as user interface 320 that is displayed in FIG. 3B to select the chart type.

Display 420 of FIG. 4B shows a reference line 422 that is added to the display of the charts 412 and 414. As illustrated, the reference line is set to a value of $8,000. The reference line 422 spans across the displayed charts. According to one embodiment, values that fall below the reference line 422 are formatted differently from the values that are at or above the reference line 422. For example, the values below the reference line may be colored/shaded differently from the values that fall at or above the reference line. In the current example, values above the reference line are illustrated darker than the values at or below the reference line. The displayed values within data 424 may also be formatted based on the reference line 422 that is created.

Display 430 of FIG. 4C illustrates selecting a value in a displayed chart. As illustrated, a user has selected point 432. A user may select a point in different manners. For example, a user may navigate and hover over a point, click on the point, and the like. Point 432 corresponds to the December value for the women's row of data. When a point is selected, more information is provided to the user. According to one embodiment, the additional displayed information includes the value for the point as well as the difference between the point and the reference line. In the current example, the corresponding point is highlighted on the display of the other charts (in this case chart 414) and a corresponding display of information is presented. On the display of the men's chart 414, the value for the men's December value is presented along with the difference between the value and the reference line. Other information may also be included in the display. For example, a comparison could be made between the men's and women's data values and/or different formatting applied to the value that is larger/smaller then the selected point.

FIG. 5 illustrates a display of a bar chart in which the displayed charts have been sorted.

As illustrated, display 510 shows a display of a men's chart 512 and a display of a women's chart 514. In addition to changing the formatting of displayed charts, a user may sort the displayed charts based on various criteria. For example, in the current example, the charts displayed in FIGS. 4A-4C were sorted based on the chart title resulting in the display of the men's chart 512 to the left of the display of the women's chart 514. As illustrated, spin control 516 is a control that may be used to sort the display of the charts. Other controls and/or user interfaces may also be used to control the sorting of the charts. Generally, spin control 516 is configured such that a user may cycle through a variety of options by selecting one of the displayed arrows on spin control 516. For example, the charts could be sorted based on downward trends, upward trends, chart title, low to high values, high to low values, average values, and the like. The selected option is illustrated within the display of spin control 516. In the current example, the current option selected is "Chart Title." While spin control 516 is configured to include options for sorting charts, a spin control may be configured to apply other options. Generally, a spin control may be configured with different options that are displayed within the pie sections illustrated within the spin control (See FIGS. 8 and 9 for more details regarding spin controls).

Figure 6:
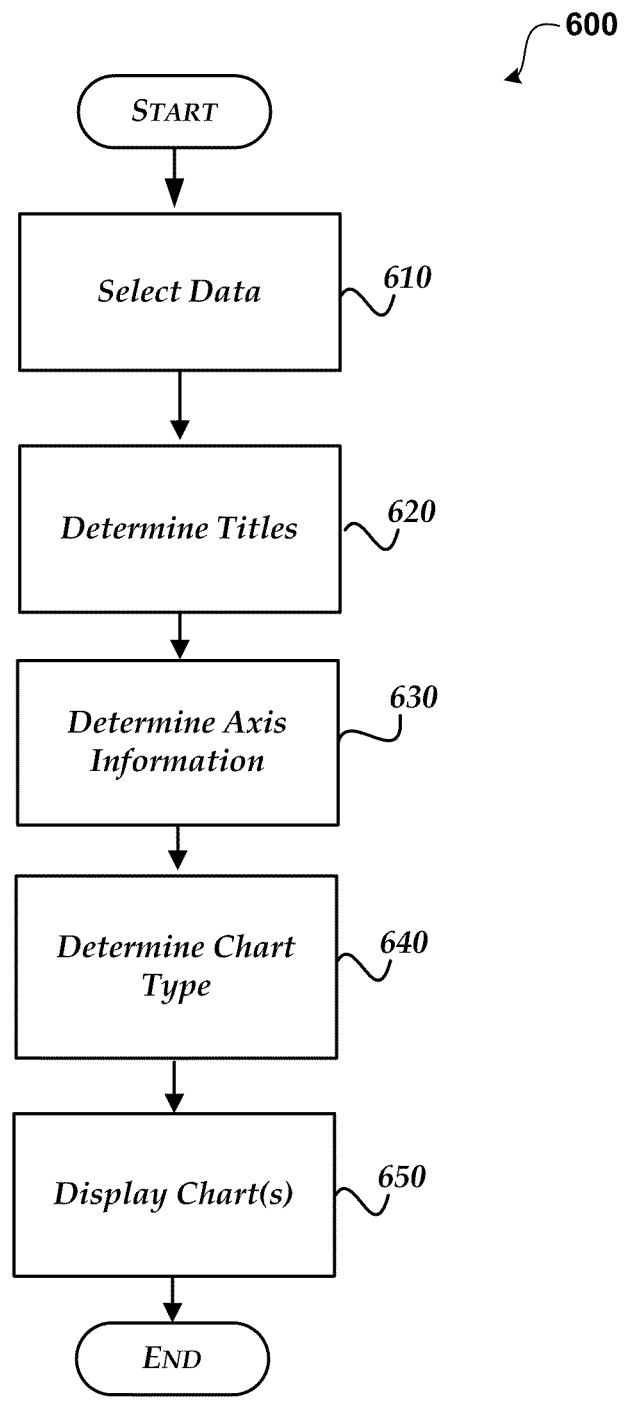
FIG. 6 illustrates a process for temporarily charting selected data.
Figure 7:
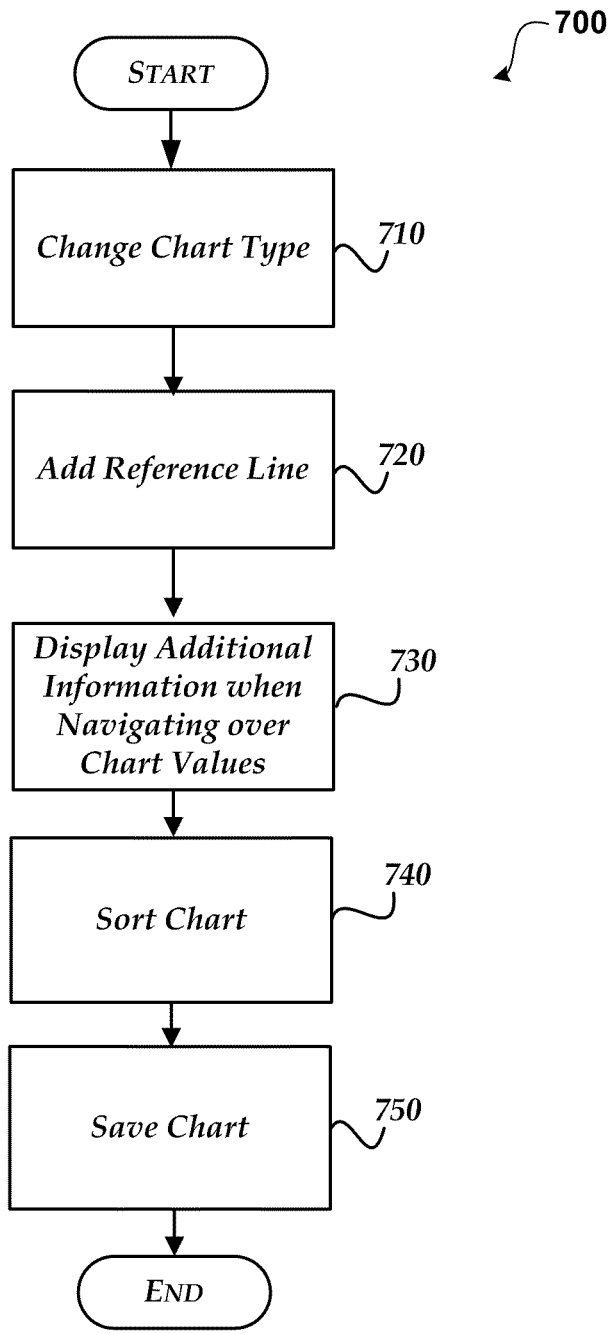
FIG. 7 shows a process for formatting temporarily displayed charts.

Referring now to FIGS. 6-7, illustrative processes for temporarily formatting and charting selected data is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 6 illustrates a process 600 for temporarily charting selected data.

After a start operation, the process flows to operation 610, where data to be temporarily formatted and charted is selected. A user may select as much or as little data to view within a chart as desired. For example, a user may select one or more full or partial rows of data.

Moving to operation 620, the chart title and axis information is determined from the selected data. When the data selected does not include the title information for the selected rows and/or columns, the data is traversed until the corresponding title for the row/column is obtained. For example, row data may be traversed from the right to the left until the title column for the row is reached. In the example illustrated above, each of the selected rows is traversed until the Women's title (Women) is obtained and the Men's title (Men) is obtained. Similarly, each column may be traversed to determine the title for each column. For example, for each selected column the data may be traversed until a title for the column is determined. In the examples presented above, the column titles are the selected months (i.e. January-December). While the column titles may not be initially displayed in the charts, this information may be used when a point is selected within a displayed chart (e.g. see point 338 in FIG. 3C).

Flowing to operation 630, the axis information for the chart(s) to display is determined. According to one embodiment, each displayed chart shares a common axis. The shared axis is determined from the range of the selected values.

Moving to operation 640, the chart type to display is determined. The chart type may be predetermined or the chart type may be determined based on a variety of factors such as: the number of values selected; the type of data selected; a range of values selected, and the like. The chart type may also be selected by a user. For example, a user may select an option to enter the temporary charting mode and select the type of chart that they would like to display when data is selected.

Transitioning to operation 650, the chart(s) are displayed. According to one embodiment, a separate chart is displayed for each row of data that is selected. For example, when one row is selected a single chart is displayed and when five rows are selected, five charts are displayed. According to one embodiment, a single chart may be used to display the selected data. In this embodiment, the data for each row may be visually formatted to distinguish the values from one row of selected data from another row of selected data. The charts may be displayed within the same window as the selected data or one or more different windows. For example, the charts may be displayed in a pop-up window over the displayed data. According to one embodiment, the data that is not selected is not displayed when the charts are displayed. According to another embodiment, the unselected data is displayed during the display of the charts. In addition to displaying the charts, the selected data may be formatted to further provide visual differences to the user.

The process then flows to an end operation and returns to processing other actions.

FIG. 7 shows a process 700 for formatting temporarily displayed charts.

After a start operation, the process flows to operation 710, where the chart type is changed for the temporarily displayed charts. The chart type that is displayed may be different types of charts. For example, the chart type may be a line chart, an area chart, a column chart, a pie chart, and the like. In addition to changing the chart type, the user may also switch the rows/columns. According to one embodiment, each of the displayed charts is displayed using the selected type of chart. According to another embodiment, each chart that is displayed may be of a different type.

Moving to operation 720, one or more reference lines is added to the display of the charts. The reference line spans across each of the displayed charts and provides a user with a visualization of how the values within the displayed chart compare to the reference value. The formatting of the values within the chart are determined based on whether the currently displayed value is above or below the reference line. For example, the values above the reference line are formatted in one manner (i.e. a first shade) and values below the reference line are formatted in a different manner (i.e. a second shade). When more than one reference line is displayed, the values between the two reference lines may be displayed in a third manner (i.e. a third shade). In addition to changing the formatting of the values based on the reference line, the values within the selected data may also be changed.

Flowing to operation 730, additional information is displayed to a user in response to navigating over points of the displayed charts. For example, as the user navigates over the chart, the current value of the navigated point may be displayed. According to one embodiment, the corresponding values in the other charts are also displayed. When a reference line is displayed, the current value of the navigated point may also be compared to the reference line.

Transitioning to operation 740, different sorting options may also be selected by a user. For example, the charts could be sorted based on downward trends, upward trends, chart title, low to high values, high to low values, average values, and the like.

Moving to operation 750, one or more of the charts may be saved for later display. The charts may be saved as a group or each chart may be individually selected for saving. The charts may be saved in many different ways. For example, the charts may be saved using a copy operation and saved to a clipboard, the charts may be saved as an image file, and the like.

The process then flows to an end operation and returns to processing other actions.

Figure 8:
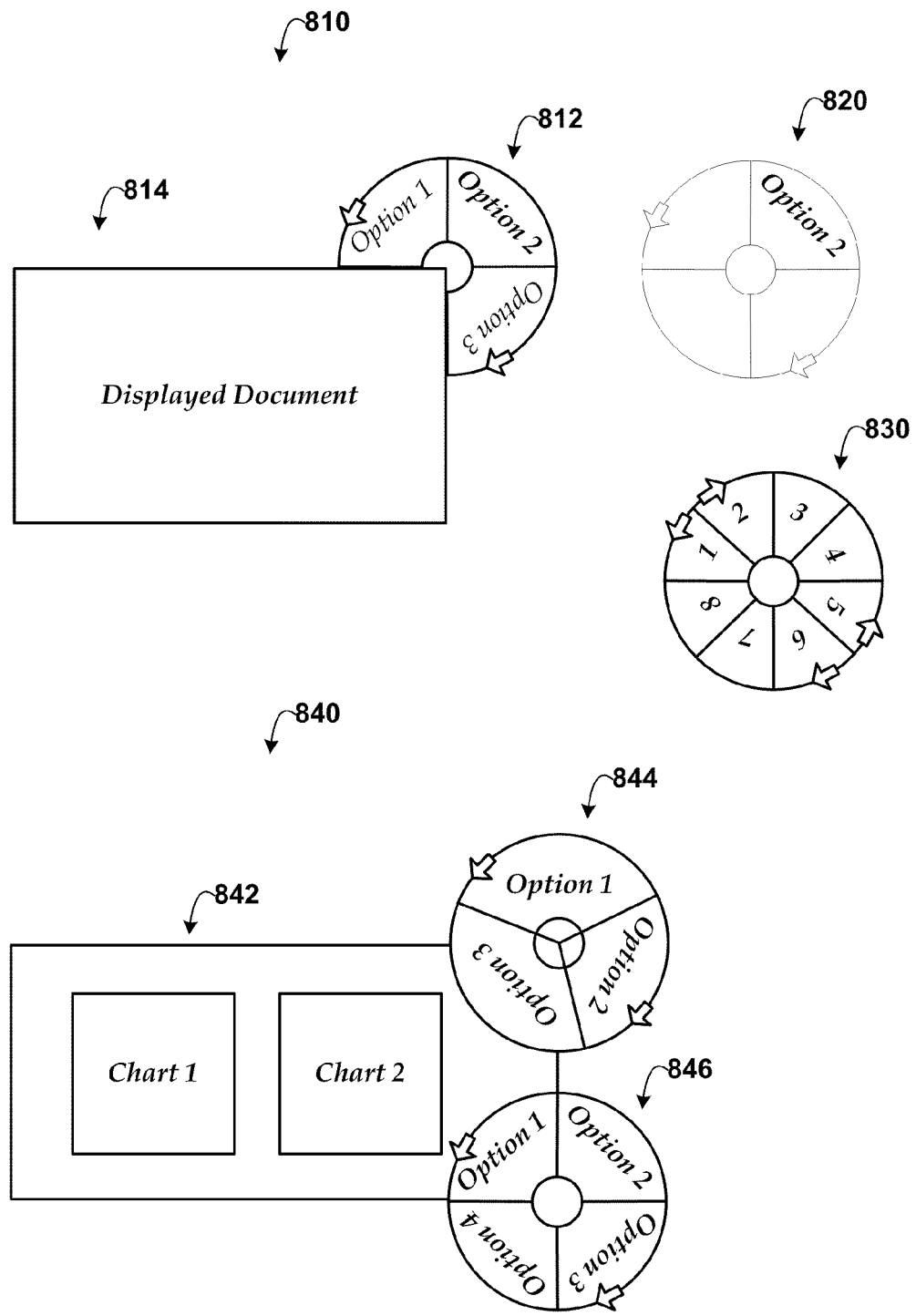
FIG. 8 illustrates an exemplary spin control circular user interface used in selecting an option.

FIG. 8 illustrates an exemplary spin control circular user interface used in selecting an option. The spin control circular user interface is organized into distinct pie regions depending on the number of options that may be applied to a displayed document. For example, the circular user interface may include two or more pie regions that each present a different option.

Illustration 810 shows spin control 812 that includes four pie regions arranged circularly for presenting options, including Option 1, Option 2, Option 3 and Option 4. As illustrated, Option 4 is hidden by the displayed document 814. Alternatively, Option 4 may be shown over the displayed document or shown in a translucent manner over the displayed document such that the user could still see the content of the displayed document under the translucent display of Option 4 of spin control 812.

Spin control 812 may be navigated in different ways. For example, a user may move a pointing device from one region to another region within spin control 812 causing the spin control to rotate to display another option that is available to the user. The options presented by the pie regions may be displayed in many different ways. For example, the current option that is being used by displayed document 814 may be formatted differently from the other options that are associated with CUI 812. As illustrated, Option 2 is bolded showing that Option 2 is currently applied to displayed document 814. Spin control 812 is configured to rotate clockwise and counterclockwise around it's center. Spin control 812 may be configured to rotate and expose different options upon a selection of another region within spin control 812 and/or using some other user interface element (e.g. selection of an arrow). The option may be automatically selected and applied to the displayed document upon the rotation of spin control 812 or the option may be manually selected after exposing a new option. For example, a user may rotate spin control 812 exposing Option 4 and then click within the display of Option 4 to select the option. Alternatively, an option may be automatically selected in response to the movement of the spin control. In the current example, a clockwise movement of spin control 812 would automatically select Option 1, whereas a counterclockwise movement of spin control 812 would automatically select Option 3.

Spin control 820 shows the graphical circular user interface with only the currently applied option displayed. Upon rotation of spin control 820, the next option is displayed. According to another embodiment, an option may be discovered upon a pointing device entering a different option area. For example, as soon as a pointing device enters another option area within the spin control, a name of the option may become visible. In this way, a user may preview the name of the option before selecting and/or rotating the spin control. According to one embodiment, the current option that is applied is shown diagonally in the upper right portion of the displayed spin control.

Spin control 830 illustrates a graphical circular interface with eight different options and a set of two arrows that may be selected to rotate the spin control. The number of options depends upon the number of selections that are available to a user and may be applied to the displayed document.

Display 840 illustrates the use of multiple spin controls for a displayed document 842. More than one spin control may be used to interact with a displayed document. Generally, each spin control is configured to perform a different operation upon the displayed document. For example, spin control 844 may be used to select different chart types for displaying chart 1 and chart 2 and spin control 846 may be used to apply different sorts to chart 1 and chart 2. According to one embodiment, the spin control is displayed at one of the corners of display to which it affects.

Figure 9:
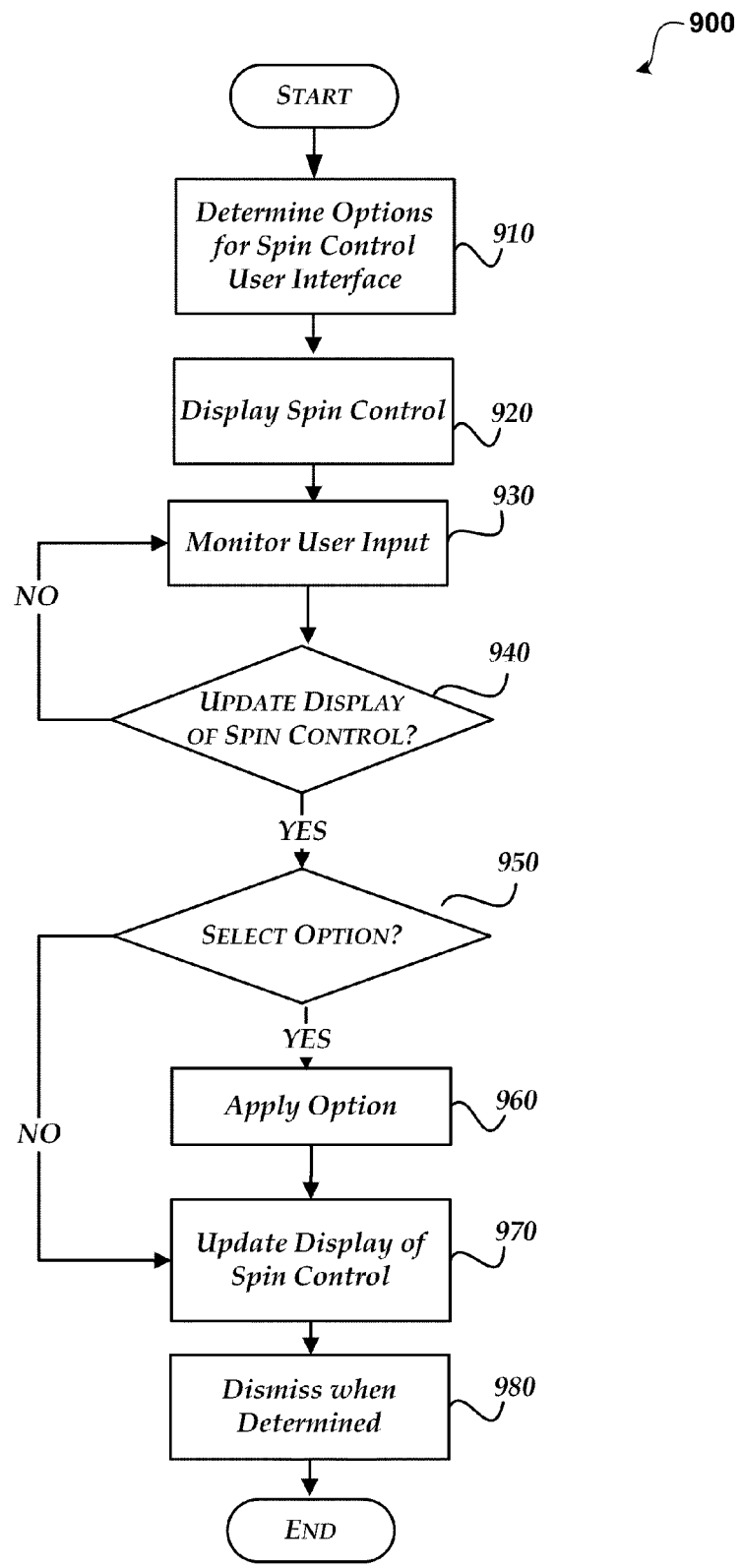
FIG. 9 shows a process for displaying and interacting with a spin control.

FIG. 9 shows a process for displaying and interacting with a spin control.

After a start operation, the process flows to operation 910, where a determination is made as to what options to present within the spin control graphical user interface. According to one embodiment of the invention, the options presented in a spin control are related to one another. For example, a spin control may be used to select a type of chart to display, apply formatting to a document, and the like.

According to one embodiment, when the spin control is first displayed a currently selected option is displayed. The currently applied/selected option may provide an indication that a feature is turned off. For example, when an option may be turned on or off an indication may show that the option is turned off (e.g. see display 330 in FIG. 3C showing a spin control with "No Sort" displayed). The currently applied option may also show the user an option that is currently applied to the displayed document, such as a chart. For example, when the spin control includes options for the chart type (e.g. line, bar, area . . . ), the type of chart displayed is provided within the description within the menu.

Moving to operation 920, the spin control is displayed. According to one embodiment, only the currently applied option is displayed. According to another embodiment, more than the current option is displayed. For example, all or some of the options may be displayed within or near the spin control. In the case where all of the options are displayed, different formatting may be applied to the currently applied option (e.g. bold, different color, larger font, and the like). According to one embodiment, the spin control is displayed at one of the corners of display to which it affects. More than one spin control may be used with a displayed document. For example, in the examples presented above, a spin control that provides sort options may be illustrated in one corner and a spin control that provides the different chart options may be provided in another corner.

Flowing to operation 930, user input is monitored to determine when to update the spin control. The user input may come from many different types of input devices, such as touch screen, a mouse, a pen, voice, and the like.

Moving to decision operation 940, a determination is made as to whether to update the display of the spin control based on the user input. According to one embodiment, when a user selects an area within the spin control for an option that is not currently applied, the spin control rotates either clockwise or counterclockwise depending on the location of the selection. A user may also select some other area of spin control, such as an arrow indicator, in order to rotate the spin control. When the spin control is not to be updated, the process returns to operation 930. When the spin control is to be updated, the process moves to decision operation 950.

At decision operation 950, a determination is made as to whether to select the option. According to one embodiment, the option is automatically selected upon rotation of the spin control. According to another embodiment, the option is manually selected by the user after the display of the spin control is updated to display the option resulting from the rotation of the spin control. When the option is not automatically selected to be applied, the process moves to operation 960. When the option is to be automatically selected and applied to the displayed document, the process moves to operation 960, where the option is applied.

At operation 960, the option is applied to the displayed document. For example, when a user causes the spin control to rotate to another option, such as a different sort option, that option is applied to the displayed charts and they are sorted according to the option resulting from rotating the spin control.

At operation 970, the display of the spin control is updated. When the option was selected and applied in step 960, the spin control is updated to display the currently applied option. According to another embodiment, a spin control may be updated to display a preview of an option. For example, when a user positions a cursor (or some other pointing device) in a region adjacent to the currently selected option, a display of that option may be displayed to the user.

Transitioning to decision operation 980, the spin control is dismissed when determined. For example, the spin control may be automatically dismissed when the displayed document to which the spin control applies is no longer displayed. The user can also dismiss a spin control by selecting an option to hide the spin control.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for temporarily formatting and charting data using a spin control, comprising:
    receiving a user selection of data that are currently displayed on a display;
    determining values within the selected data;
    automatically displaying first information in a chart representing the values from the selected data wherein the chart is automatically created and displayed in response to receiving the user selection of data; and
    displaying a spin control that rotates around a center point and includes options arranged in pie regions around the center point, in response to selection of an option in the spin control, displaying other information in the chart that represents values from the selected data that are sorted based on the selected option, wherein the center point is located adjacent to the chart and wherein a portion of the spin control is partially hidden by a display of the chart that the spin control is operable to affect.

2. The method of claim 1, wherein the spin control rotates clockwise and counterclockwise, wherein movement of the spin control exposes different options to apply to the chart.

3. The method of claim 2, further comprising rotating the spin control to expose the different options in response to determining a pointing device selecting a pie region within the spin control that is outside of the pie region that represents a currently applied option.

4. The method of claim 2, wherein a rotation of the spin control automatically selects another option and applies the another option to the displayed chart.

5. The method of claim 2, wherein the center point of the spin control is located at a corner of the displayed chart.

6. The method of claim 5, further comprising displaying a second spin control at a second corner of the displayed chart, wherein the second spin control comprises options to perform a second set of options on the displayed chart.

7. The method of claim 2, wherein the spin control includes options for sorting the displayed chart or changing a type of the displayed chart.

8. The method of claim 2, further comprising displaying only a name of the currently applied option to the chart within the spin control and exposing a different name for an option after the spin control is rotated.

9. A computer-readable storage medium, not including a signal, having computer-executable instructions for interacting with a spin control graphical user interface, the instructions executing on a processor of a computer, comprising:
    automatically displaying a document having first information in response to receiving a user selection of data and that is created from values within the user selection of data;
    determining options to present within a spin control; wherein the options when selected are applied to the displayed document;
    displaying the spin control near the displayed document and partially obscured by the displayed document; wherein the spin control is divided into pie regions based on the determined options to present within the spin control; wherein each of the pie regions represents one of the determined options;
    monitoring user input to determine when the spin control is interacted with;
    updating a display of the spin control in response to the spin control being manipulated by user input that results in a different portion of the spin control being partially obscured by the displayed document; wherein the spin control rotates around a center point; and
    applying an option that is selected in response to the rotation of the spin control such that the document displays other information representing the values within the user selection of data that are sorted based on the selected option.

10. The computer-readable storage medium of claim 9, wherein the spin control rotates clockwise and counterclockwise, wherein the rotation of the spin control exposes different options to apply to the displayed document.

11. The computer-readable storage medium of claim 10 wherein the option that is presented within a pie region of the spin control that is displayed diagonally to the displayed document is automatically applied when the spin control is rotated.

12. The computer-readable storage medium of claim 10, further comprising rotating the spin control to expose the different options in response to determining a pointing device selecting a region within the spin control that is outside of the pie region that represents a currently applied option.

13. The computer-readable storage medium of claim 11, wherein a rotation of the spin control provides a display of a name of an option before a user manually selects the option for application to the displayed document.

14. The computer-readable storage medium of claim 12, wherein the spin control is located at a corner of the displayed document.

15. The computer-readable storage medium of claim 10, further comprising displaying only a name of the currently applied option to the displayed document within the spin control and exposing a different name for an option after the spin control is rotated.

16. A system for displaying and interacting with a spin control graphical user interface element, comprising:
    a processor and a computer-readable medium;
    an operating environment stored on the computer-readable medium and executing on the processor;
    a display for displaying a document and a spin control;
    a visual manager operating on the processor; and configured to perform tasks, comprising:
    automatically displaying a document having first information in response to receiving a user selection of data and that is created from values within the user selection of data;
    determining options to present within the spin control; wherein the options when selected are applied to the displayed document;
    displaying the spin control on the display near a display of the document and partially obscured by the displayed document; wherein the spin control is divided into pie regions based on the determined options to present within the spin control; wherein each of the pie regions represents one of the determined options;
    monitoring user input to determine when the spin control is activated;
    updating a display of the spin control in response to the spin control being activated that results in a different portion of the spin control being partially obscured by the displayed document; wherein the spin control rotates around a center point;
    automatically applying an option that is selected in response to the rotation of the spin control such that the document displays other information representing the values within the user selection of data that are sorted based on the selected option; and
    removing the spin control from the display in response to the displayed document being removed from the display.

17. The system of claim 16, wherein the spin control rotates clockwise and counterclockwise, wherein the rotation of the spin control exposes different options to apply to the document; wherein the currently applied option is presented within a pie region of the spin control that is displayed diagonally to the document.

18. The system of claim 17, further comprising rotating the spin control to expose the different options in response to determining a pointing device selecting a pie region within the spin control that is outside of the pie region that represents a currently applied option.

19. The system of claim 17, wherein the spin control is located at a corner of the document.

20. The computer-readable storage medium of claim 9, wherein being partially obscured by the displayed document further comprises displaying an obscured portion of the spin control as a translucent portion.

* * * * *